April 23, 1963
L. H. GRENELL
3,086,559
ROLL BONDED TUBING FITTINGS
Filed Feb. 19, 1959
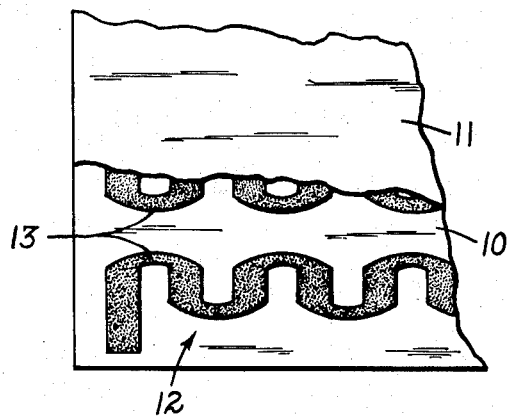
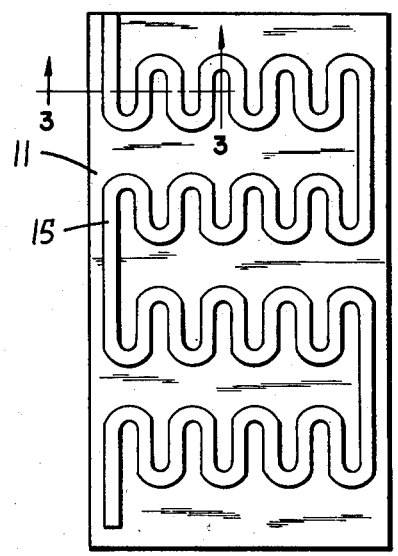
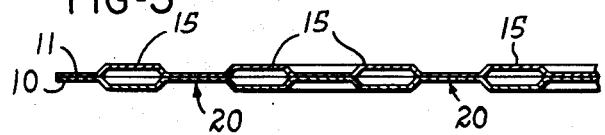
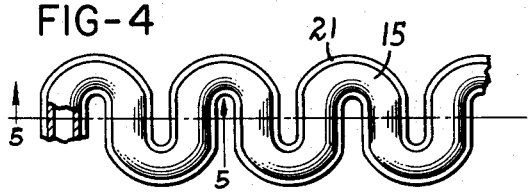
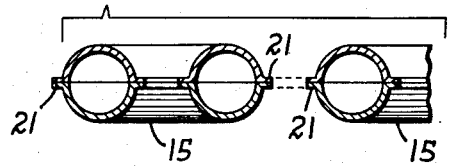
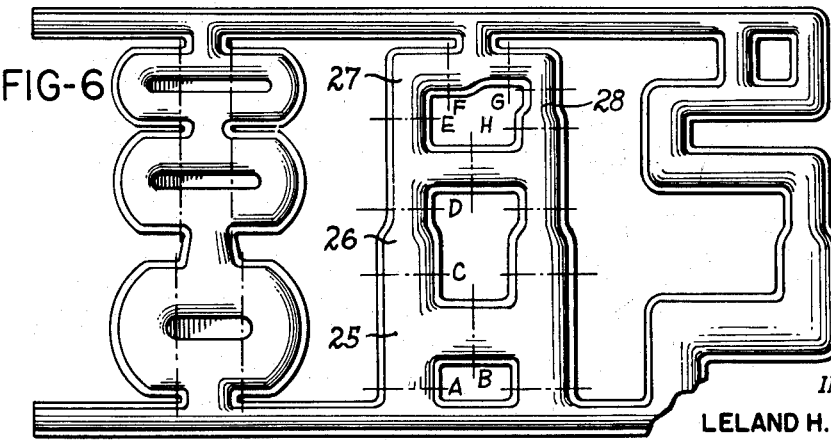
INVENTOR.
LELAND H. GRENELL
BY
ATTORNEYS

United States Patent Office 3,086,559
Patented Apr. 23, 1963

3,086,559
ROLL BONDED TUBING FITTINGS
Leland H. Grenell, R.R. 4, Sidney, Ohio
Filed Feb. 19, 1959, Ser. No. 794,290
3 Claims. (Cl. 138—157)

This invention relates to metal tubing and fittings therefor, such as elbows, T's, short-radius return bends, reducing connectors, and the like, and more particularly, to such tubing parts or fittings or connections produced from expanded roll-bonded or pressure welded metal sheets or plates.

In the use of seamless metal tubing for conducting a refrigerant or heat exchange fluid, for example, as in refrigeration or air conditioning apparatus, it may be desired to provide separate fittings (such as elbows of various angles, T's, size reduction or increasing connectors, return bends, nipples and the like in a wide variety of configurations) for interconnecting lengths of tubing in the particular pattern or configuration desired instead of attempting to bend a single length of tubing throughout the various serpentine or other paths or configurations desired. Especially is this the case in the manufacture of serpentine tubing for heat exchangers and the like where the inherent characteristics of the metal tubing may limit the shortness of a radius of curvature possible in a bend thereof. Similarly, in the utilization of such metal tubing as fluid conduits, specially formed and relatively expensive connectors may be utilized for interconnecting tubing of two different sizes, and if it is desired for one piece of tubing to intersect another at a T, a specially made fitting may be provided which includes a soldered or other type of joint at the juncture of the two pieces of tubing.

Fittings for purposes such as outlined above are commonly produced by fabrication from tube stock or by casting, and both such methods are relatively costly, as is in part due to the necessity for separate molds for each size and type of fitting as well as the finishing operations required on the rough castings. It is a primary object of the present invention to provide an improved fitting which can be produced at a greatly descreased unit cost as compared with conventional fittings.

Another object of the invention is to provide tubular fittings for use with metallic or other tubing in a virtually infinite variety of configurations and sizes as may be desired, and substantially independently of limitations which the inherent characteristics of the metal might impose upon the radius of curvature of a bend or the drawing of a small diameter tubing to a larger diameter, and free of butted or inserted joints as in T's or Y fittings.

These results are accomplished according to this invention by imprinting or otherwise applying to the surface of a sheet of metal in any desired pattern a material which prevents the roll-bonding or welding of the metallic sheet in the areas to which the material is applied (such material being hereinafter referred to as "stop-weld" material), and then roll bonding or welding another sheet of metal to that which has the stop-weld material applied thereto for bonding the two sheets tightly together in areas thereof free of the stop-weld material. Thereafter the two sheets are expanded or forced apart in the areas where no roll-bonding has occurred by the injection of fluid pressure to form tubular elements conforming to the pattern of the stop-weld material, and these tubular elements are then cut apart and removed from the original sheets to form the tubing fittings as required.

One object of this invention is to provide tubing fittings of the character described which are formed from drawn sheet metal, which are substantially free of soldered or brazed joints, and which include shapes or configurations other than those which can be readily formed from bent metal tubing.

A further object of this invention is to provide a unitary lattice formed of a plurality of interconnected tubing fittings of the character described such that a variety of individual fittings can be cut or separated from the lattice in a variety of configurations as required for use.

Other objects and advantages of this invention will be apparent from the following description, the accompanying drawing, and the appended claims.

In the drawing—

FIG. 1 is a somewhat diagrammatic elevational view, partly broken away, showing two metal sheets assembled for roll bonding in accordance with the invention, with one of the sheets partially broken away to show the pattern of stop-weld material on the other sheet;

FIG. 2 shows the two sheets of FIG. 1 following roll bonding and with the fitting passageways therein partially expanded;

FIG. 3 is a partial section along the lines 3—3 of FIG. 2;

FIG. 4 is a view on a somewhat larger scale of a portion of the serpentine fittings of FIG. 2 after having been fully expanded and blanked out of the metal sheets;

FIG. 5 is a section along the line 5—5 of FIG. 4; and

FIG. 6 is a plan view of a layout or lattice including a variety of different fittings according to this invention.

In addition to the detailed disclosure contained herein regarding this invention, reference is also specifically made to my Patent No. 2,690,002, issued September 28, 1954, relating to the manufacture of hollow sheet metal fabrications having a plurality of interconnected passageways therein and to my Patent No. 2,845,695, issued August 5, 1958, and relating to a method of making reinforced refrigerating tubing. As is noted therein, two sheets of metal may be roll-bonded together with a pattern of separation or stop-weld material therebetween so that bonding or actual welding occurs under pressure between the two sheets of metal except in the areas covered by the pattern of stop-weld material. Thereafter, hydraulic pressure is injected into the areas between the metal sheets where no bonding has occurred, and these areas are expanded by the hydraulic pressure to form hollow passageways enclosed within and between the two welded sheets.

Referring now to the drawings, which illustrate preferred embodiments of the present invention, two sheets 10 and 11 of metal of the desired composition are provided. A wide latitude is available in the selection of the particular metallic composition of sheets 10 and 11, provided the metal is susceptible to a roll-bonding or roll-forging technique as is well understood and is sufficiently ductile for the drawing and expanding operations. Preferably, metal sheets composed of such metals as copper, bronze, and aluminum will be recognized as generally conforming to the composition of the metal tubing with which fittings according to this invention are to be used. Similarly, the thickness or gauge of sheets 10 and 11 is satisfactorily selected to conform generally to the thickness or gauge of the tubing with which the fittings are to be used and with due regard to the decrease in thickness occurring as a result of the subsequent rolling and drawing operations.

A pattern of separation material or stop-weld material, indicated generally at 12, is then applied to one surface of the sheet 10 by printing, painting or otherwise, as indicated in the above mentioned patents, satisfactory results being obtained using for such separation or stop-weld material water suspensions of graphite, ground oyster shells, sodium silicate, etc. Preferably such pattern is applied in the form of a continuously connected plurality of the fittings which it is desired to make—e.g., a serpentine pattern of a plurality of return bends, as in FIG. 1, or a layout of a plurality of different types of fittings, as in FIG. 6.

The thickness or width of the lines of the pattern 12 depend upon the desired inside diameter of the finished fittings and the dimensional changes incident to the elongation of metal sheets 10 and 11 in the roll-bonding operation in the direction of passage through the bonding rolls, with this dimension in the initial pattern 12 commonly ranging from one-quarter the desired final dimension in the case of aluminum to one-third the final dimension for copper, as indicated at 13 in FIG. 1. Thereafter sheets 10 and 11 are placed together with the pattern 12 therebetween and subjected to the roll-bonding operation in known manner and as indicated in the aforementioned patents, effecting bonding or welding of sheets 10 and 11 together in all areas thereof except those areas covered by the separation or stop-weld material pattern 12, and with this pattern elongated to the appropriate extent indicated diagrammatically by the comparison between FIGS. 1 and 2.

After the roll-bonding operation is completed, fluid pressure is introduced, in known manner, between sheets 10 and 11 in the areas thereof in which the separation or stop-weld material 12 has prevented welding or bonding, and the passages formed by the stop-weld material pattern are partially dilated or expanded, as indicated in FIGS. 2 and 3, to produce partially expanded conduits 15 in the bonded sheets. After partial expanding of conduits 15, the metal in the areas between these conduits is blanked or punched out, as by a suitable punching die, to free the entire pattern of conduits from the metal sheets. That is, the welded metal in the areas generally indicated by the reference numeral 20 in FIG. 3 is blanked out of the metal sheets to produce the pattern itself, as indicated in FIG. 4, with the exception, however, that the blanking or punching operation leaves a narrow flange at 21, satisfactorily about an eighth of an inch wide, all around the pattern.

Referring particularly to FIG. 5, since the original sheets 10 and 11 are roll-bonded or welded together along flange 21, this flange or fin serves to hold the two sheets together around the expanded channels 15. After blanking the pattern from the sheets, further fluid pressure is introduced into channels 15 to dilate or expand them to fully rounded cross section, as indicated in FIGS. 4 and 5, producing a lattice unit of rounded conduits forming a plurality of fittings affixed together, with the expansion and final shape and size of the fittings being controlled by enclosing them between female die blocks having complementary patterns therein providing such desired final outer dimensions of the expanded fittings. At the same time, this control of the outer configuration of each fitting provides, in combination with appropriately high injected pressure, the desired accurately circular inner configuration, as shown in FIG. 5, for ready telescoping over and bonding to the ends of the tubing to be joined.

The fittings produced according to this invention may be stored or shipped in such connected or assembled form—e.g., as a long serpentine conduit element, part of which is indicated in FIG. 4—for later separation at the point of use, or the actual finishing of the fittings can be undertaken prior to shipment. For example, considering the serpentine element of FIG. 4, a single cut along the center of the FIG. 4 device (i.e., along the section line 5—5) will separate the serpentine structure into a plurality of U-shaped return bends, which are then available for connecting the ends of straight lengths of tubing in the fabrication of, for example, a heat exchanger, and which at most require only minor final sizing or finishing of the open ends or cut edges of the fittings.

If the original stop-weld pattern is laid out to form a finished lattice somewhat as indicated in FIG. 6 and comprising a plurality of different kinds of fittings, it may be preferred to wait the actual separation of the individual fittings until the point of use. Thus, for example, cutting the fittings apart along the lines A, B, and C will produce a T fitting 25, whereas cutting the lattice of FIG. 6 along the lines A, B, and D produces a T 25 with a diameter reducing connection portion 26 on one end thereof. Similarly a cut along the lines C and D produces a reducing connector or nipple 26 for joining two pieces of tubing of different diameters, a cut along the lines E and F produces an elbow 27, and a cut along the lines G and H produces a reducing elbow 28.

As will be noted from the foregoing, there is provided according to this invention tubing fittings and methods for producing them in a virtually infinite variety of sizes, shapes, and configurations substantially independent of such dimensional limitations as may be imposed by the inherent characteristics of seamless metal tubing in the manufacture of tubing fittings by bending or joining pre-formed tubing. For example, return bends, such as indicated in FIG. 4 or at the left of FIG. 6, can be produced according to this invention having the radius of curvature of the outer curve of the bend as small as $13/16$ inch or less when the inside diameter of the tubular channel is as large as $11/32$ inch.

Similarly, this invention provides substantial economic advantages in the manufacture of tubing fittings as compared with either bending and joining pre-formed tubing or casting fittings, particularly when it is understood that several hundred individual fittings can be produced according to this invention from a single set of large sheets 10 and 11, a single application of pattern 12, and a single processing through the roll-bonding, blanking and dilating steps herein described. As will be understood, due consideration is given in the practising of this invention and in the laying out of pattern 12 so that a minimum of sheet metal material is wasted during the punching or blanking operation to form the lattice arrangement as indicated in FIGS. 4 or 6, and it is comprehended within this invention to form in a single lattice unit such as FIGS. 4 or 6 all of the individual fittings which might be necessary in a particular tubing installation or application so that only a unitary lattice containing all the necessary fittings need be stored or shipped or packaged, instead of a plurality of small individually handled and fabricated cast or formed tubing fittings.

While the articles herein described constitute preferred embodiments of the invention, it is to be understood that the invention is not limited to these precise articles, and that changes may be made therein without departing from the scope of the invention which is defined in the appended claims.

What is claimed is:

1. A tubular fitting of the character described for connecting lengths of metal tubing for use as fluid conduits and the like, comprising a unitary body of ductile metal including two complementary wall sections each of which forms one-half of said fitting, said two sections being received in mating relation to form a tubular body and including a portion along the longitudinal midplane thereof defining a joint therebetween, a continuous flange along each side of said body and extending outwardly of said joint, and said metal of said joint, flanges and wall sections having substantially the same metallurgical grain size.

2. A fitting of the character described for connecting lengths of metal tubing for use as fluid conduits and the like, comprising a unitary body of ductile metal including two complementary wall sections each of which forms one-half of said fitting, said two sections being of semi-circular cross-section to form a hollow body circular in section and including a portion defining a joint therebetween, a continuous flange along each side of said body and extending radially outwardly of said joint, and said joint, flanges and wall sections being of substantially the same metal and having substantially the same metallurgical grain size.

3. A unitary assembly of a plurality of separable sheet metal tubing fittings of the character described connected together to form a lattice from which a plurality of differently shaped fittings may be removed for use in connecting lengths of tubing and the like, which comprises a series of hollow tubular conduits connected and formed as a unit and including a variety of bends and branches oriented such that certain of said bends and branches define a variety of differently shaped individual fittings, all said conduits and bends and branches being formed of two complementary pieces of drawn sheet metal having narrow flanges extending along opposite sides thereof, and the metal of each of said fittings and the flanges thereof having substantially the same metallurgical grain size.

References Cited in the file of this patent

UNITED STATES PATENTS

| | | |
|---|---|---|
| 90,322 | Vanstone | May 18, 1869 |
| 351,479 | Taplin | Oct. 26, 1886 |
| 2,262,627 | Whitesell | Nov. 11, 1941 |
| 2,477,315 | Smith | July 26, 1949 |
| 2,509,782 | Person | May 30, 1950 |
| 2,662,273 | Long | Dec. 15, 1953 |
| 2,690,002 | Grenell | Sept. 28, 1954 |
| 2,700,988 | Smisko | Feb. 1, 1955 |
| 2,822,151 | Heuer et al. | Feb. 4, 1958 |
| 2,830,800 | Gerhardt | Apr. 15, 1958 |
| 2,856,164 | Adams | Oct. 14, 1958 |
| 2,920,377 | Janos | Jan. 12, 1960 |
| 2,932,491 | Miller | Apr. 12, 1960 |

FOREIGN PATENTS

| | | |
|---|---|---|
| 190,585 | Great Britain | Dec. 28, 1922 |